United States Patent
Wain et al.

(10) Patent No.: US 9,853,831 B2
(45) Date of Patent: Dec. 26, 2017

(54) COMMUNICATION MODULE

(71) Applicant: Control Techniques Limited, Newtown (GB)

(72) Inventors: Richard Mark Wain, Newtown (GB); Bryce Trevor Beeston, Newtown (GB); Luke Duane Orehawa, Newtown (GB); James Robert Douglas Kirkwood, Church Stretton (GB)

(73) Assignee: NIDEC CONTROL TECHNIQUES LIMITED, Newtown (GB)

(*) Notice: Subject to any disclaimer, the term of this patent is extended or adjusted under 35 U.S.C. 154(b) by 139 days.

(21) Appl. No.: 14/173,154

(22) Filed: Feb. 5, 2014

(65) Prior Publication Data

US 2014/0226680 A1   Aug. 14, 2014

(30) Foreign Application Priority Data

Feb. 8, 2013 (GB) .................................. 1302278.5

(51) Int. Cl.
*H04L 29/06* (2006.01)
*H04L 12/413* (2006.01)
*H04L 12/46* (2006.01)

(52) U.S. Cl.
CPC ........ *H04L 12/413* (2013.01); *H04L 12/4625* (2013.01)

(58) Field of Classification Search
CPC ....................................................... H04L 29/06
USPC ......................................................... 370/466
See application file for complete search history.

(56) References Cited

U.S. PATENT DOCUMENTS

| | | | |
|---|---|---|---|
| 5,301,185 A | 4/1994 | Cherry | |
| 5,752,255 A * | 5/1998 | Jarvis .................. | G06F 12/0802 711/3 |
| 7,339,948 B2 | 3/2008 | Balasubramanian et al. | |
| 7,615,893 B2 * | 11/2009 | Biester et al. .................. | 307/82 |
| 8,536,731 B2 * | 9/2013 | Biester ................ | E21B 33/0355 251/315.01 |
| 9,114,056 B2 * | 8/2015 | Imboden .................. | A61H 1/00 |
| 2002/0156837 A1 * | 10/2002 | Batke et al. .................. | 709/203 |

(Continued)

FOREIGN PATENT DOCUMENTS

| | | |
|---|---|---|
| CN | 102594641 | 7/2012 |
| CN | 102621936 | 8/2012 |

(Continued)

OTHER PUBLICATIONS

Regulatory 802.3 & IEC 950, Nick Stapleton, 3Com, Apr. 3, 2000.*

*Primary Examiner* — Edan Orgad
*Assistant Examiner* — Nourali Mansoury
(74) *Attorney, Agent, or Firm* — Harness, Dickey & Pierce, P.L.C.

(57) ABSTRACT

A control module for use within a control network, the control module comprising: interface circuitry for enabling communication with an external device; communication means configured to communicate with the external device over the control network by communication with the interface circuitry; coupling means configured to mechanically couple the control module to an adjacent control module and provide a data connection between the communication means and the adjacent module; and an electrical isolation in the data connection between the communication means and the coupling means.

7 Claims, 6 Drawing Sheets

(56) References Cited

U.S. PATENT DOCUMENTS

| | | | |
|---|---|---|---|
| 2004/0252421 A1* | 12/2004 | Knox, Jr. | H01R 9/2641 |
| | | | 361/23 |
| 2005/0129037 A1 | 6/2005 | Zumsteg et al. | |
| 2006/0011595 A1* | 1/2006 | Daniel et al. | 219/130.1 |
| 2007/0085424 A1* | 4/2007 | Scharnick | 307/326 |
| 2009/0028227 A1 | 1/2009 | Nouis et al. | |
| 2009/0129395 A1 | 5/2009 | Janssen et al. | |
| 2011/0062888 A1* | 3/2011 | Bondy | H05B 33/0815 |
| | | | 315/294 |
| 2012/0033392 A1* | 2/2012 | Golubovic | H02S 40/34 |
| | | | 361/752 |
| 2012/0221155 A1* | 8/2012 | Miles et al. | 700/286 |

FOREIGN PATENT DOCUMENTS

| | | |
|---|---|---|
| CN | 203965890 | 11/2014 |
| EP | 1304837 | 4/2003 |
| WO | 2006/110047 | 10/2006 |
| WO | 2013/018786 | 2/2013 |

\* cited by examiner

COMMUNICATION MODULE

CROSS-REFERENCE TO RELATED APPLICATION

This application claims the benefit and priority of Great Britain Patent Application No. 1302278.5 filed Feb. 8, 2013. The entire disclosure of the above referenced application is incorporated herein by reference.

FIELD

This invention relates, but is not limited, to the implementation of communication modules, communication assemblies and communication networks, such as control modules, control assemblies and control networks within an industrial control environment.

BACKGROUND

Communication applications, such as industrial control applications, can be harsh environments for the transmission of communication signals within a communication network. This is in part due to the amount of electromagnetic noise within the environment. As such, communication protocols and transmission media through which the communication signals are transmitted often have to be robust so that they can withstand the potentially corrupting effects of electromagnetic interference. Communications which are robust to such noise typically require high transmission power and/or resilient signalling techniques. In addition, in some environments the distance covered by communication signals may be large, which provides further constraints upon the implementation of a communication network within an industrial control environment.

Industrial control environments typically implement communication networks, such as control networks, comprising a number of control modules which may act as nodes for the network. In some control networks, some nodes are displaced from others, whilst other nodes are grouped together in close proximity. Where some of the modules or nodes are located in close proximity, such as to take measurements or transmit control signals to a particular device or for other actions to take place, the relevant modules may also be mechanically coupled to one another. In an attempt to reduce the cost of implementing a control network, it is common to separate communications into sections which use different protocols. A first protocol may be used for communication over a long distance in an often noisy environment and a second, different, communication protocol used for communication between modules which are grouped together.

The second protocol may be a simpler or less robust protocol than the first protocol because it is operating in a relatively benign environment often between mechanically coupled modules. The second protocol may differ in that the packet structures and/or physical layer properties are not the same as the first protocol. As such, the displaced nodes within the control network may communicate using a first protocol and a group of nodes within the control network may separately communicate with one another using a second protocol. Such arrangements require protocol conversion circuitry to convert between the first protocol and the second protocol. The protocol conversion circuitry, however, is typically active circuitry which requires external electrical power and signal processing which increases the power requirements, cost and complexity of the control network implementation and may also add processing delays to the communication. This is particularly disadvantageous for industrial control environments which may require fast acting real time or deterministic communication.

What is needed is an implementation of communication within a control network in which the cost and complexity is reduced without negatively impacting upon the effectiveness of the network communication.

SUMMARY

According to disclosed embodiments there is provided a control module for use within a control network, the control module comprising: interface circuitry for enabling communication with an external device; communication means configured to communicate with the external device over the control network by communication with the interface circuitry; coupling means configured to mechanically couple the control module to an adjacent control module and provide a data connection between the communication means and the adjacent module; and an electrical isolation in the data connection between the communication means and the coupling means.

By providing a control module which comprises coupling means configured to mechanically couple the control module to an adjacent control module in addition to electrical isolation in the data connection between a communication means and the coupling means of the communication module, it is possible to implement communication, such as control communication, between modules using only a single communication protocol in a cost effective manner which does not negatively impact upon the operation of each communication module. By providing isolation between coupling means and the communication means of a particular communication module, the amount of noise current which passes through the communication means is reduced. The isolation of the communication module not only isolates the communication means from other elements of the communication network but also prevents noise currents induced in the interface circuitry of the communication module from negatively impacting the operation of the communication means.

This is particularly advantageous in communication networks where only a single communication protocol is deployed since the isolation provided between the coupling means and the communication means may be stipulated in some way by the communication protocol. Moreover, these features enable the deployment of a communication network, such as a control network, using a single, unified communication protocol without requiring the deployment of additional and significant isolation within the communication module.

By providing this capability, it is also not necessary to perform protocol conversion within a communication assembly such as a control assembly, since all of the elements use the same communication protocol as the remainder of the communication network. As such, it is possible to implement the integration of mechanically coupled modules into a communication network without the need for a second communication protocol and a protocol converter. This is because the implementation of a robust communication protocol within mechanically coupled communication modules is simplified by providing a connection between the interface circuitry and the communication means without negatively impacting upon the operability of the individual modules.

It is to be understood that other aspects of the present disclosure will become readily apparent to those skilled in the art from the following detailed description, wherein various embodiments of the disclosure are shown and described by way of illustration. As will be realized, the disclosure is capable for other and different embodiments and its several details are capable of modification in various other respects, all without departing from the spirit and scope of the present disclosure. Accordingly the drawings and detailed description are to be regarded as illustrative in nature and not as restrictive.

BRIEF DESCRIPTION OF THE DRAWINGS

Embodiments will now be described by way of example with reference to the accompanying drawings in which.

DETAILED DESCRIPTION

Figure 1:
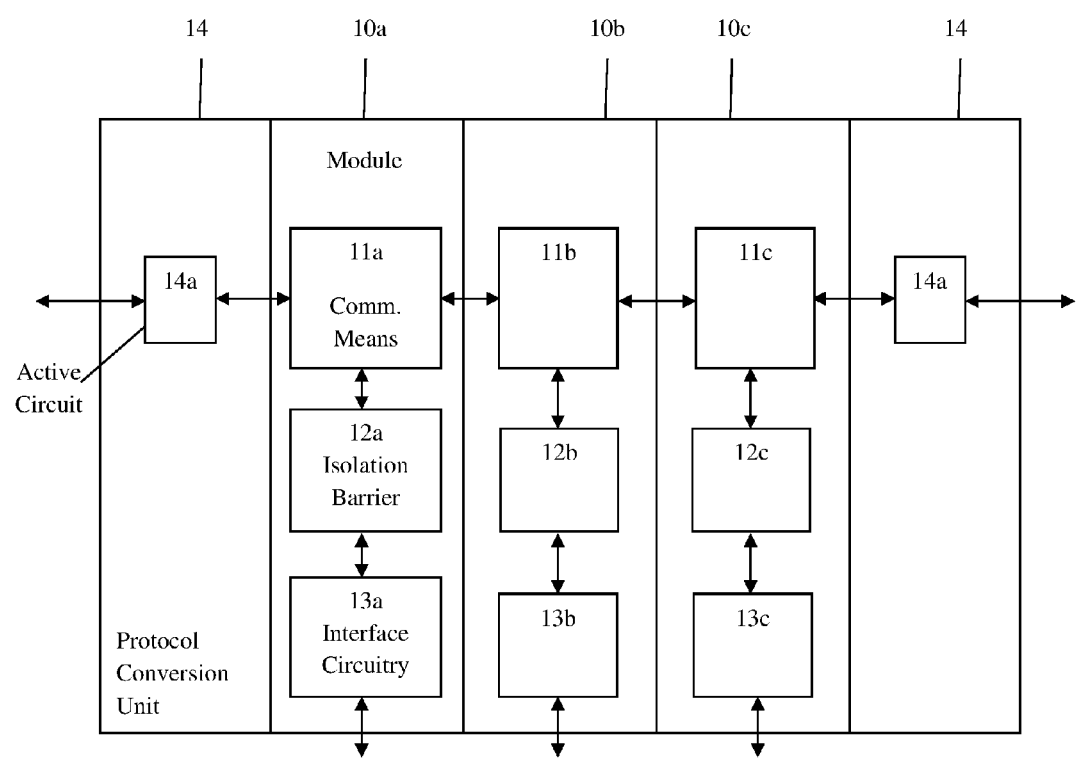
FIG. 1 is a view of coupled control modules.

FIG. 1 illustrates an arrangement of control modules in a control network, such as an industrial control network. A number of control modules 10a, 10b, 10c are shown, in which electrical connectivity is provided between the modules 10a, 10b, 10c. Each control module 10a, 10b, 10c comprises a communication means 11a, 11b, 11c which is formed of electrical circuitry necessary to enable communication between each of the communication means 11a, 11b, 11c. Each control module 10a, 10b, 10c also comprises an isolation barrier 12a, 12b, 12c which comprises electrical isolation configured to inhibit the passing of electrical noise through the control modules 10a, 10b, 10c. Each control module 10a, 10b, 10c also comprises interface circuitry 13a, 13b, 13c, which comprises electrical circuitry configured to interact with external devices. The interaction between the interface circuitry 13a, 13b, 13c and external devices exposes the control module 10a, 10b, 10c to noise and thus noise currents may be induced within each control module 10a, 10b, 10c. The isolation barriers 12a, 12b, 12c are configured to reduce the noise currents flowing through and possibly corrupting the communication means 11a, 11b, 11c and the interface circuitry 13a, 13b, 13c.

As also illustrated in FIG. 1, previously the control modules 10a, 10b, 10c required protocol conversion units 14a, 14b which are attached at either end of the coupled control modules 10a, 10b, 10c. The protocol conversion units 14 convert the protocol used by the communication means 11a, 11b, 11c to a different communication protocol and/or different physical layer implementation which is typically more noise robust in order to enable communication beyond the mechanically coupled control modules 10a, 10b, 10c. In order to convert protocols, the protocol conversion units 14 comprised active circuits 14a, 14b which required electrical power and typically used a processor in order to perform the protocol conversion.

Figure 2:
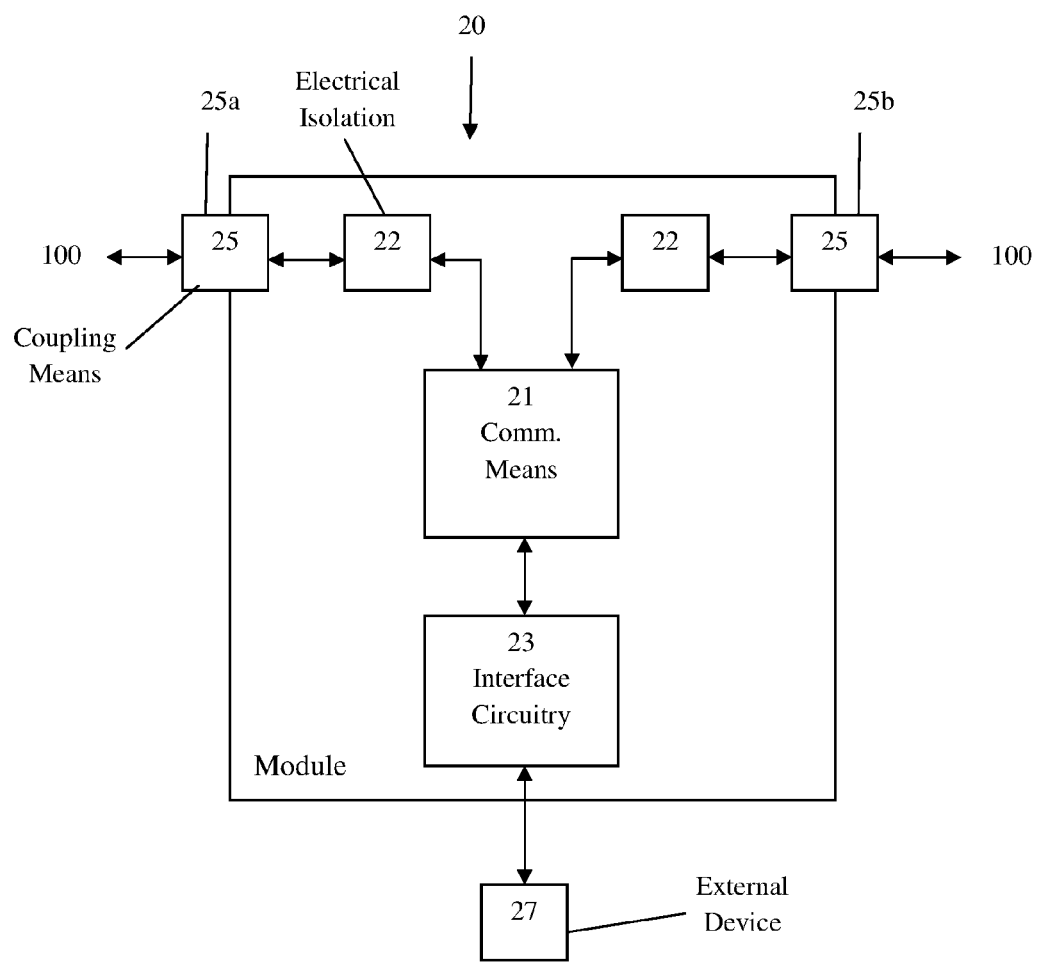
FIG. 2 is a view of a control module according to the present disclosure.

FIG. 2 illustrates a communication module 20 of the present disclosure. The communication module 20 is a control module which comprises a communication means 21 which is configured to act as a network node to enable communication with other control modules within a communication network, such as a control network 100, using a particular communication protocol. For example, the communication means 21 may be configured to communicate over Ethernet at a number of different data rates, such as 10 BASE-T, 100 BASE-TX, 1000 BASE-T, or 10 GBASE-T. Other protocols that can be used in a control environment can be used. The communication means 21 comprises electrical circuitry, for example signal transceivers, signal conditioning circuitry and/or a processor. The communication means 21 is configured to enable communication handshaking or to perform collision detection and/or any other functions required in order to communicate through the control network 100. The communication means 21 may also comprise other elements which enable the control module 20 to act as a node or element on the control network 100. In some embodiments, the communication means 21 does not comprise electrical isolation.

As illustrated in FIG. 2, the control module 20 comprises an external network connection. In some embodiments, the external network connection comprises one or more coupling means 25 configured to provide mechanical coupling between the control module 20 and other adjacent control modules. The coupling means 25 may be formed of one half of a cooperating mechanism which enables the control module 20 to mechanically connect to an adjacent module. In some embodiments, the mechanical coupling may be such that the control modules are coupled together substantially along a common axis, although other configurations and arrangements of the control modules can be used.

The coupling means 25 may comprise a simple releasably engageable mechanism, such as a simple locking mechanism in order to ensure a reliable mechanical coupling between adjacent control modules. For example, the cooperating coupling means may include a tab in order to couple adjacent control modules. The coupling means 25 may also comprise one or more electrical contacts. The electrical contacts of adjacent control modules are directly connected when adjacent control modules are mechanically coupled. In this way, the electrical connection between the control modules is made by the coupling and maintained throughout mechanical coupling. In some embodiments, the coupling means may comprise a slidable mechanism in order to mechanically couple adjacent control modules together. In some embodiments, the slidable mechanism may comprise electrical contacts which are configured to engage cooperating electrical contacts of an adjacent control module as the modules slidably engage. In some embodiments, the slidable mechanism may comprise a protrusion and a channel which are configured to cooperate. In some embodiments, each control module comprise both a protrusion and a channel. In some embodiments, the protrusion and the channel of each control module may extend along a length of the control module. In other embodiments, the protrusion and the channel may extend along a portion of a length of the control module.

In some embodiments, the control module 20 may comprise more than one coupling means 25. In some embodiments, the control module 20 may comprise a first coupling means 25a and a second coupling means 25b. The first and second coupling means 25a, 25b may differ and be configured to cooperate with each other. As such, one of the first 25a or second 25b coupling means may cooperate with a corresponding coupling means of an adjacent control module. For example, the first coupling means 25a of the control module may be configured to cooperate with and mechanically couple to a complementary second coupling means 25b of an adjacent control module. Similarly, the second coupling means 25b of the control module may be configured to cooperate with and mechanically couple to a first coupling means of an adjacent control module. In this manner, it is possible to mechanically couple a plurality of control modules together. In some embodiments, the coupling means need not be located opposite one another on the control module and may be placed elsewhere on the control module.

The control module 20 of FIG. 2 also comprises electrical isolation 22, which is connected between the coupling means 25 and the communication means 21. In some embodiments, the electrical isolation 22 comprises a transformer. In some embodiments, the communication protocol used by the communication means 21 specifies the requirements for electrical isolation 22. In the embodiment where the protocol defines the degree or type of isolation, the electrical isolation may be configured to conform to that specification. For example, the communication means 21 may be configured to communicate using Ethernet. In that example, the isolation 22 may be configured to conform to the Ethernet standard.

In some embodiments, where the control module 20 comprises two or more coupling means 25a, 25b, the control module 20 may comprise electrical isolation 22 between each coupling means 25a, 25b and the communication means 21. In this way, the communication lines that pass between communication means of adjacent control modules are isolated from each other.

Control module 20 further comprises interface circuitry 23 configured to electrically connect to the communication means 21 and provide an external electrical connection for the control module 20. The interface circuitry 23 of the control module 20 is configured to interact with external devices within the industrial control environment as part of the control functionality provided by the control network 100. The external devices may not be, of themselves, connected to or in communication with the control network 100. In some embodiments, the interface circuitry 23 may be configured to communicate with, take measurements from or otherwise control an external device or module through the external electrical connection it provides. As such, the interface circuitry 23 may be exposed to external noise, typically in the form of noise currents induced into the interface circuitry 23.

The communication between the external device and the control network may include the supply of electrical power or the provision of at least one control signal to control the operation of the external device through the interface circuitry. The external device may be any device which is used in an industrial control environment. The external device may by any type of actuator, motor, or drive. For example, the external device may be an AC motor, a DC motor, a servo. Such external devices commonly induce noise currents. The external device may provide feedback to the control device 20 through the interface circuitry 23.

The interface circuitry 23 may be configured to communicate with the communication means 21 so that data may be passed between them. The communication link between the interface circuitry 23 and the communication means 21 enables the passing of information between the interface circuitry 23 and the rest of the network. As such, data collected from the interface circuitry 23 is available to the rest of the network through the communication means 21. In addition, messages, such as control messages, sent through the control network 100 may be passed to the interface circuitry 23 in order for the interface circuitry 23 to operate as intended by the network.

The connection between the communication means 21 and the interface circuitry 23 may be a direct connection. For example, the communication means 21 and the interface circuitry 23 may connect such that no elements are placed between them. In some embodiments, the communication means 21 and the interface circuitry 23 may be connected such that they share the same voltage potential. In some embodiments, the interface circuitry 23 and the communication means 21 may not be electrically isolated from one another.

In some embodiments, the interface circuitry 23 and the communication means 21 may each comprise a controller, such as a microprocessor, Programmable Logic Device (PLD), Programmable Logic Controller (PLC) or Field-Programmable Gate Array (FPGA) configured to control the operation of the interface circuitry 23 and the communication means 21. In some embodiments, one of the interface circuitry 23 and the communication means 21 may comprise a controller that is configured to control the operation of the other. In some embodiments, the control module 20 may comprise a controller, separate from the interface circuitry 23 and the communication means 21, and which is configured to control both the communication means 21 and the interface circuitry 23. The particular implementation of the controller to operate the interface circuitry 23 and the communication means 21 is well within the routine design choices of the skilled person.

By connecting the interface circuitry 23 to the communication means 21, the interface circuitry 23 is exposed to a potentially noisy environment. As discussed above, the noise generated from the external sources may present itself as noise currents within the interface circuitry 23 located within the control module 20. Prior network modules have overcome this problem by utilising an isolation barrier, commonly in the form of opto-isolators and/or DC-DC converters placed between interface circuitry and communication means in order to ensure that external noise does not interfere with the communication means.

In the arrangement of FIG. 2, isolation 22 is provided between the communication means 21 and each coupling means 25a, 25b. By providing the isolation 22 between the communication means 21 and the coupling means 25a, 25b, the isolation 22 is capable of reducing the flow of noise current through the communication means 21 or the communication lines which are used to connect the communication signals between nodes of the control network 100.

It is known from the electrical theory relating to Kirchhoff's current laws that the total electrical current flowing into an electrical node is equal to the total electrical current flowing out of that node. Therefore, by providing isolation 22 between the coupling means 25 and the communication means 21, the noise current flowing out of the control module 20 through the coupling means 25 is reduced. As such, the amount of current that flows through the communication means 21, is also reduced. Therefore, isolation between the communication means 21 and the interface circuitry 23 is not required in order to reduce the noise current passing through the communication means 21.

The reduced current flow due to the isolation 22 is particularly advantageous in arrangements where the communication protocol used by the communication means 21 to enable communication over the control network 100 utilises, recommends, specifies or demands some form of isolation between nodes of the network. For example, this occurs where the protocol specifies that the communication means of a particular node is electrically isolated from the other nodes of the network. One such example of a communication protocol which specifies isolation in this way is Ethernet (IEEE 802.3) which is the basis of the exemplary embodiments described herein.

Communication protocols, such as Ethernet, may be used over long distances and thus can exhibit problems relating to the physical separation of nodes. For example, differences in potential at each node may cause issues such as ground offsets between the nodes. As such, in order to comply with some communication protocols, it is desired or necessary to implement electrical isolation between nodes. This isolation may also provide short circuit protection from other nodes.

Therefore, the isolation 22 performs two separate isolating functions using the same element. The first function provided by the isolation 22 being placed between the communication means 21 and the coupling means 25 is to aid the communication of data within the control network 100 by isolating each network node, or control module, from the other network nodes in the network whilst also providing short circuit protection for each network node. The second function provided by the isolation 22 placed between the coupling means 25 and the communication means 21 is the isolation or reduction of the external noise currents which are induced through the interface circuitry 23 and interact with the communication means 21.

Figure 3:
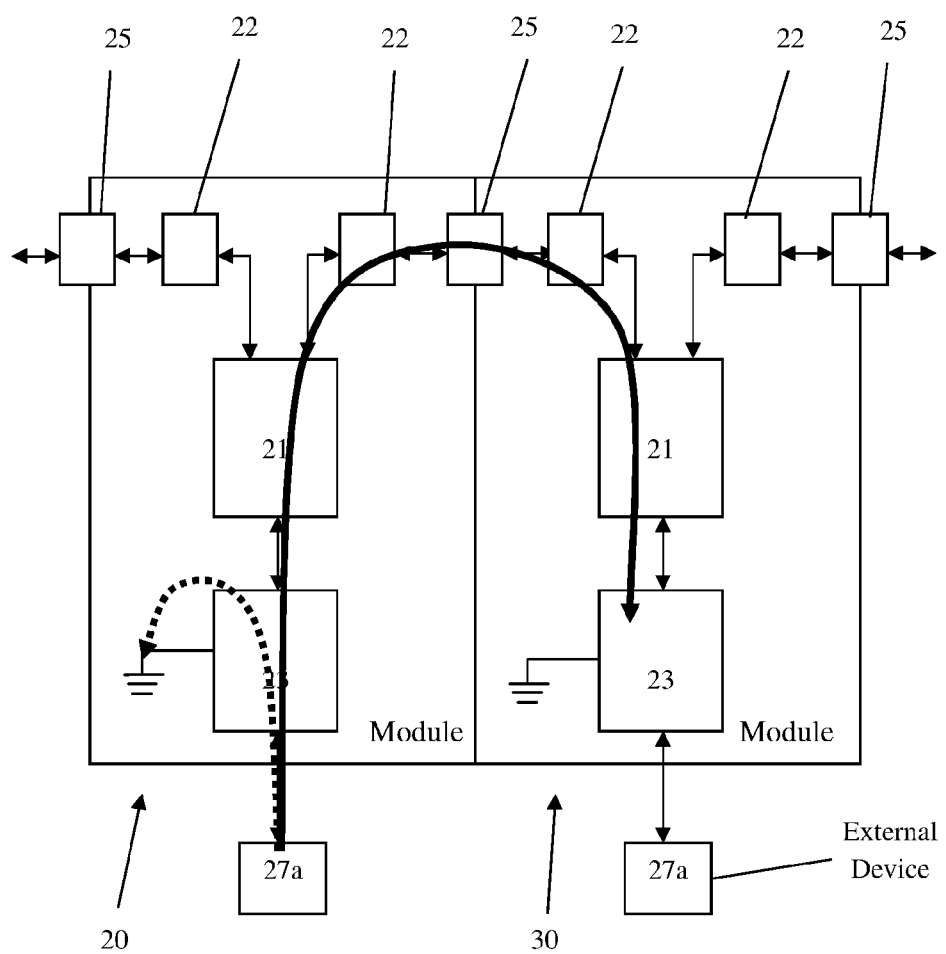
FIG. 3 is a view illustrating noise current flow through mechanically coupled control modules.

FIG. 3 illustrates the noise current flow through an exemplary control module 20. Electrical current is known to flow to an earth or GND connection, and the amount of current flowing through different electrical paths to earth will depend upon the electrical impedance of that path. In the exemplary arrangement illustrated in FIG. 3, in the circumstance where the isolation is not provided, the noise current is able to flow through the communication means 21 and may be detected on the communication lines such that it flows to an adjacent module 30 in order to flow to earth. This is illustrated in FIG. 3 by the solid black line. The applicants have recognised that, by reducing or inhibiting the amount of noise current that is able to flow through the isolation 22, the amount of noise current that flows through the communication means 21 is also reduced or inhibited, since the noise current will find another route to earth. This is indicated in FIG. 3 by the dashed line. Any noise current that would that would have passed through the communication lines to the adjacent control module 30, would also have had to pass through the communication means 21. Since the noise current path through the communication lines to earth is removed by the isolation, the current that would have passed through the communication lines must flow to earth through another path. As such, less noise current passes through the communication means 21 than would occur if no isolation 22 were in place.

In some embodiments, the communication protocol used by the communication means 21 does not stipulate a particular degree or type of isolation. In some embodiments, the isolation 22 may be implemented simply as best practice for communication.

By providing isolation 22, the noise currents entering the control module 20 through the interface circuitry do not interfere with or upset the communication means 21 to the same degree as if the isolation 22 were not present since a reduced amount of noise current will flow through the communication means 21. Moreover, the isolation 22 reduces any noise currents from flowing onto the communication lines or to an adjacent control module 30.

Figure 4:
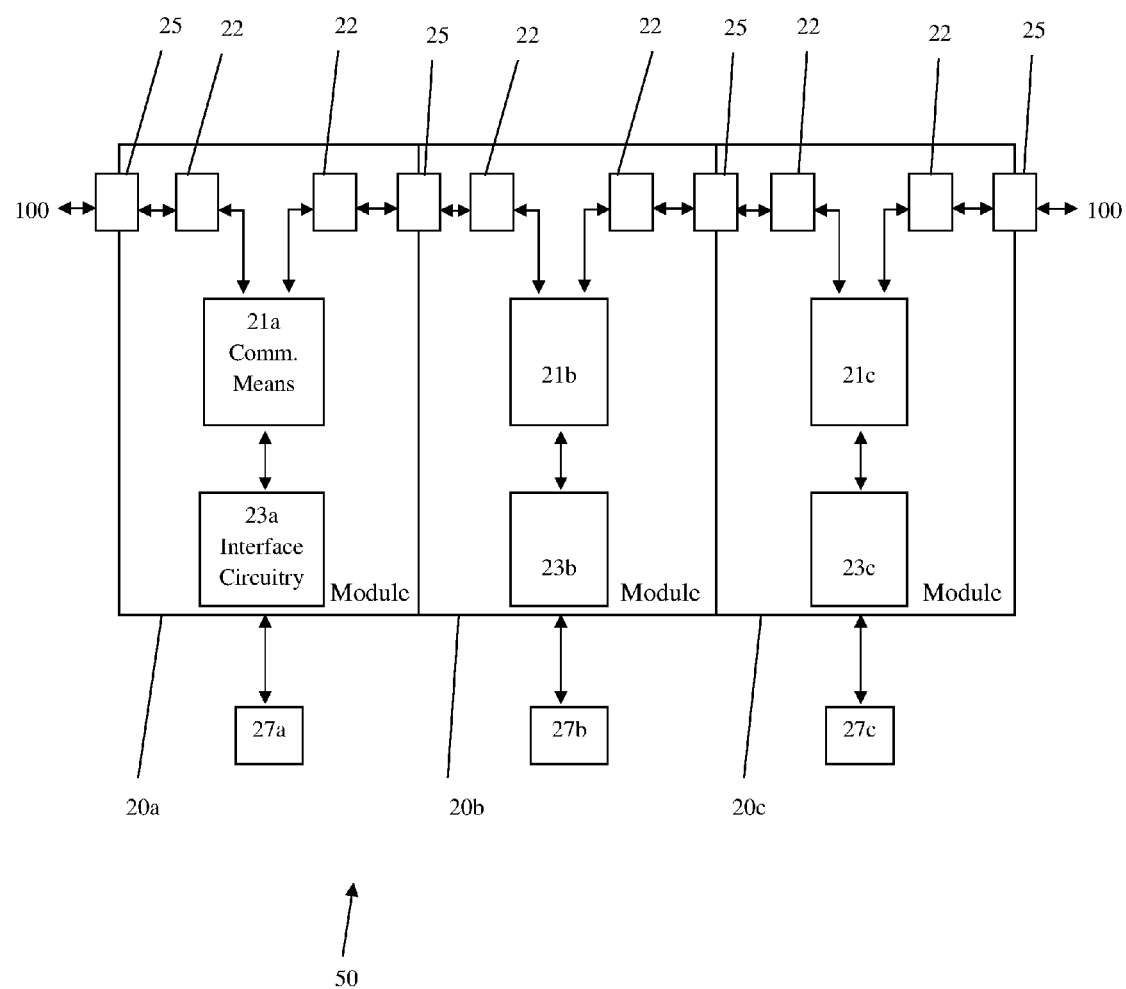
FIG. 4 is a further view of a control assembly.

FIG. 4 illustrates an embodiment of the present disclosure in which a control assembly comprises control modules 20a, 20b and 20c that are mechanically coupled to one another through respective coupling means 25, in the manner previously described. As also previously described, the mechanical coupling of the modules 20a, 20b, 20c also provides electrical connectivity between the modules 20a, 20b, 20c through the use of electrical contacts which are made when the modules are mechanically coupled. This electrical connectivity enables electrical communication through each module 20a, 20b, 20c to form an arrangement of nodes within a network. The communication lines between the control modules 20a, 20b, 20c are therefore connected so that the control modules 20a, 20b, 20c are in communicative connection with each other.

Each module 20a, 20b, 20c comprises communication means 21a, 21b, 21c which enables communication between the control modules 20a, 20b, 20c using a standard and unified communication protocol across all of the control modules 20a, 20b, 20c which are mechanically coupled to one another. Each control module 20a, 20b, 20c is configured to act as a node in the control network 100 since the communication means 21 of each control module 20a, 20b, 20c may be configured to operate as a node on the control network 100. Each control module 20a, 20b, 20c which acts as a node of the control network 100, is electrically isolated from adjacent nodes by the isolation provided between each respective communication means 21a, 21b, 21c.

In some embodiments, where the control modules are arranged as illustrated in FIG. 4, it may be necessary only to include a single element of isolation 22 for each control module 20a, 20b, 20c. For example, by providing isolation only to the first coupling means 25a for each control module 20a, 20b, 20c, it is possible to isolate each control module from the other control modules by virtue of the isolation in the adjacent control module, e.g. by utilising the isolation of the second coupling means 25b of the adjacent control module 20a, 20b, 20c.

It will be appreciated that, in some embodiments of the control assembly 50, the control modules 20a, 20b, 20c may be electrically powered separately and individually. In some embodiments, the electrical power and earth connections may be passed between modules. In some embodiments, the electrical power and earth connections may be passed through the coupling means 25. Careful routing of the power and earth connection may also reduce the amount of noise currents that are introduced in to the communication means 21.

As also shown in FIG. 4, each control module 20a, 20b, 20c comprises interface circuitry 23a, 23b, 23c configured to connect to external devices 27a, 27b, 27c. In some embodiments, the interface circuitry 23a, 23b, 23c may be configured to communicate different aspects or elements of the same device. In some embodiments, the interface circuitry 23a, 23b and 23c may comprise identical circuitry or may comprise different circuitry depending upon the function required.

Figure 5:
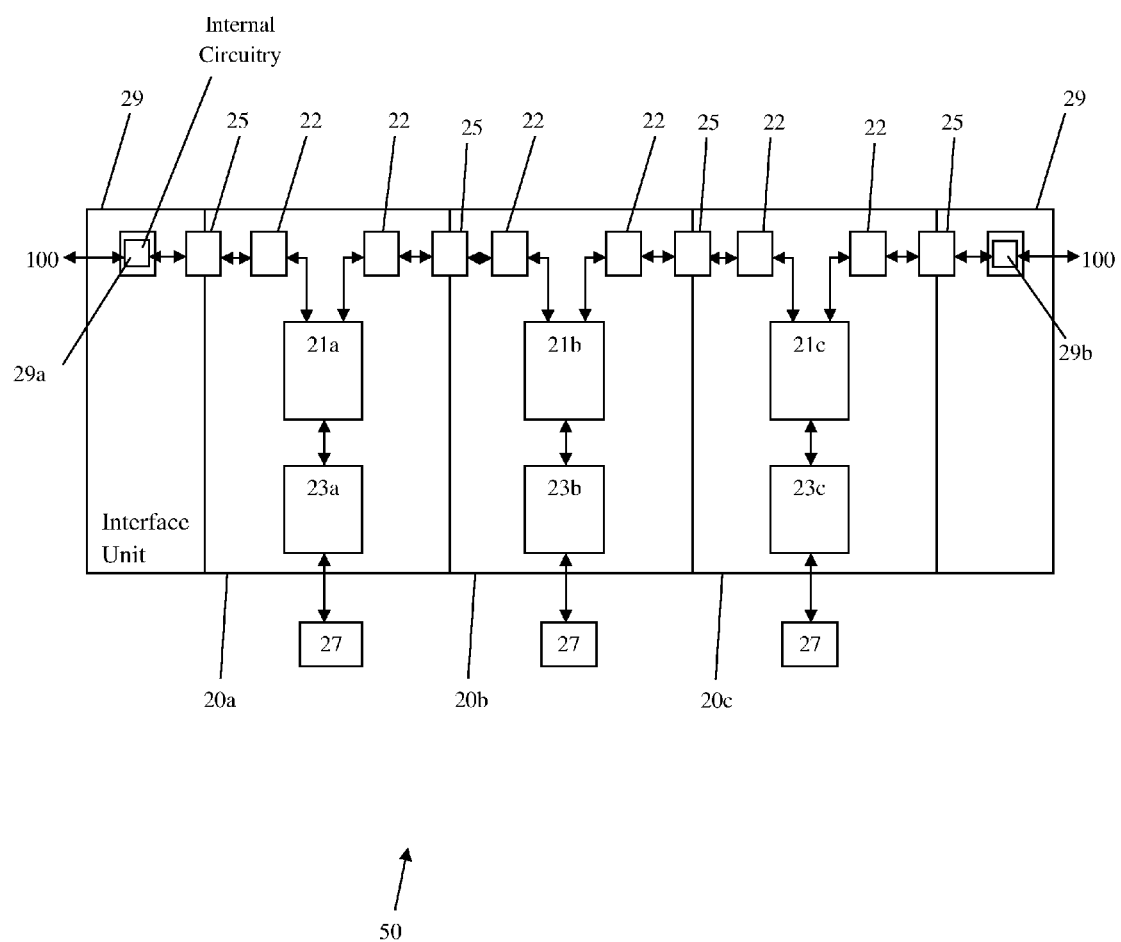
FIG. 5 is a further view of the control assembly of FIG. 4.

FIG. 5 illustrates an exemplary arrangement of the present disclosure in which coupled modules 20a, 20b, 20c are in communicative connection with interface units 29. The interface units 29 are configured to provide connectivity between the control modules 20a, 20b, 20c which are mechanically coupled together and the remainder of the control network 100. In the arrangement shown herein, the control network 100 may utilise a single communication protocol across the entire control network 100. As such, the interface units 29 are not required to perform any protocol conversion, or to change the signal levels of the communication signals. Moreover, the interface units 29 are not required to modify the data format of the communication signals. By providing a single communication protocol for the entire control network 100 the interface units 29 need only change the routing of the communication signal from one connector type to another.

For example, in some embodiments of the present disclosure the physical connection between the control modules 20a, 20b, 20c modules may be made using electrical contacts. In this manner, it is not necessary to utilise separate cabling in order to ensure electrical contact between coupled control modules 20a, 20b, 20c. The electrical contact between coupled control modules 20a, 20b, 20c is made when the control modules 20a, 20b, 20c are mechanically coupled to each other. However, in order for the coupled control modules 20a, 20b, 20c to be electrically connected with remote control modules or other nodes of the network, it is typically required to use an additional connection, such as to separate cabling. As such, the interface unit 29 must provide an interface between a connector which is configured to connect to the remainder of the network, for example via a cable and a directly engaged connector, such as through coupling means 25.

Therefore, the interface unit 29 provides a physical interface which comprises at least two physical connections. One of the physical connections is configured to cooperate with the coupling means 25 of a particular control module 20. The interface unit 29 therefore is configured to mechanically couple to a control module in order to provide an electrical connection between the interface unit 29 and the control module 20. In this way, the communication signals from the coupled control modules 20a, 20b, 20c are passed to the interface unit 29. In some embodiments, the interface unit 29 comprises a cooperative half of a coupling means 25 in order to cooperatively couple with a control module 20. In some embodiments, the interface unit 29 may have either a first coupling means 25a or a second coupling means 25b. In some embodiments, the interface unit 29 may comprise a first 25a and a second 25b coupling means in order to enable connection in a variety of different ways.

The interface unit 29 also has another physical connection comprising a mechanical connection which is configured to provide an external electrical connection to the remainder of the control network 100 via a cable or external interface. In some embodiments, the second mechanical connection of the interface unit 29 is configured as a socket in order to mate with an external plug. Conversely, the interface unit 29 may be configured as a plug in order to connect with an external socket arrangement. In some embodiments, the second physical connection may be configured to engage with an industry standard connector, such as an RJ45 (8P8C) connector.

By doing so, the electrical communication signals are simply transferred between the physical connections of the interface unit. Specifically, the communication signals are transferred between the contacts of the external cabling to that of the electrical connections provided by the coupling means 25. For example, the external electrical cabling may require a particular arrangement in order to operate within the noisy control environment, such as electrical shielding or a twisted pair arrangement. Conversely, this may not be necessary for transmission between the coupled modules 20a, 20b, 20c and thus a straight-through connection may be possible.

The interface unit 29 may also comprise internal circuitry 29a, 29b. Since the signals that are passed through the interface unit 29 are of the same protocol and are also the same, electrically, it is not necessary to perform any protocol conversion. However, in some embodiments, it may be beneficial to include passive circuitry 29a, 29b in order to perform signal conditioning on the electrical signals passing through the interface unit 29. The passive circuitry may include electrical components that do not require an external power source, such as resistors, capacitors and inductors, which are configured to improve the signal quality, for example by providing filtering.

Since the interface unit 29 utilises passive components and does not require active electrical components. The quality of the communication signals is improved at low cost and complexity. Further advantageously, it is not necessary to implement complex or power intensive circuitry in order to perform protocol conversion.

As shown in FIG. 5, the coupling means 25 at each end of the coupled control modules 20a, 20b, 20c may be connected to a respective interface unit 29. As such, it is possible to use multiple external connections to the control network 100. One advantage of this arrangement is that it is possible to enable redundancy within the connectivity of the control network 100. For example, if one of the passive circuits 29a were to fail, it would still be possible for communication between the coupled control modules 20a, 20b, 20c and the remainder of the control network 100 to occur through the other passive circuit 29b.

Figure 6:
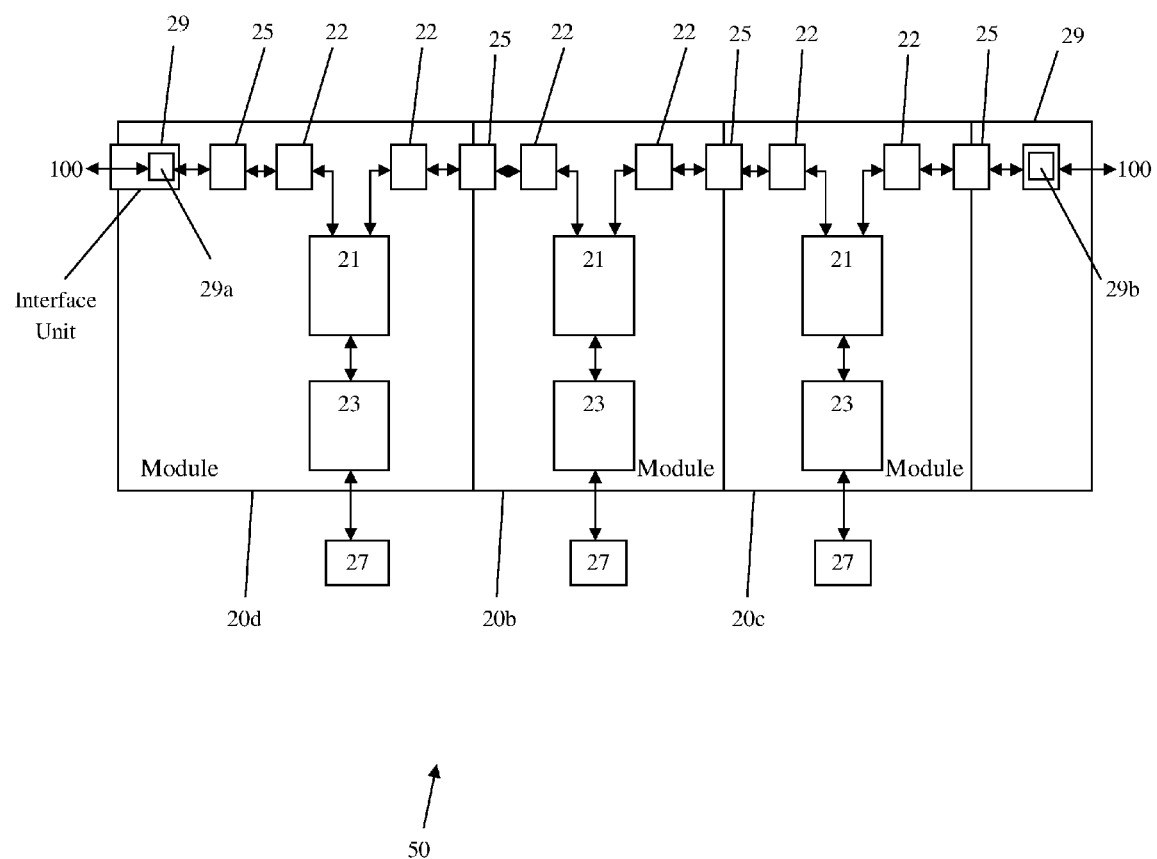
FIG. 6 is a further view of the control assembly of FIG. 5.

FIG. 6 illustrates a control assembly 50 wherein an interface unit 29 is physically integrated within a control module 20d. In this arrangement, the interface unit 29 is used to provide the external physical connection to the remainder of the control network 100, as described above with respect to FIG. 5. However, since the interface unit 29 is integrated within a control module 20d, it is not necessary to provide a separate unit and an additional mechanical coupling. Moreover, the passive circuitry 29a may directly connect to the isolation 22 of that particular control module 20d.

By providing a control module 20d with an integrated interface unit 29 the cost and complexity of providing connectivity to the remainder of the control network 100 is reduced, since it is not necessary to manufacture a separate unit for interfacing.

Moreover, as seen from FIG. 6, a modular control assembly 50 is provided since it is possible to use a combination of different elements in order to form the control assembly 50. For example, in FIG. 6 the modular control assembly 50 is formed of a number of different elements including two control modules 20b, 20c, a control module comprising an integrated interface unit 29 having passive circuitry 29a and a separate interface unit 29 that comprises passive circuitry 29b.

It will be appreciated that a number of different arrangements of these modular elements may be provided, including any number of control modules which are mechanically coupled to one another. To connect the control assembly 50 to the remainder of the control network 100, the control assembly 50 may comprise at least one interface unit 29. However, it will be appreciated that it is not necessary for the control assembly 50 to comprise a separate interface unit 29. The control assembly 50 may simply comprise a control module 20d with an integrated interface unit in order to communicate with the remainder of the control network 100.

The constituent hardware elements, operating systems and programming languages of the components of the present disclosure may be conventional in nature, and it is presumed that those skilled in the art are adequately familiar with them. Of course, the processing functions may be implemented in a distributed fashion on a number of similar platforms, to distribute the processing load.

Aspects of the methods and apparatuses described herein can be executed in a particular module. Those skilled in the art will appreciate that while the foregoing has described a particular mode, and where appropriate other modes, of performing the invention, the invention should not be limited to specific apparatus configurations or method steps disclosed. It is understood that various modifications may be made and that the subject matter disclosed may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

A number of embodiments have been described herein. However, it will be understood by persons skilled in the art that other variants and modifications may be made without departing from the scope of the embodiments as defined in the claims appended hereto.

The invention claimed is:

1. A control assembly for use within a control network, the control assembly comprising:
    a first control module; and a second control module adjacent the first control module,
    the first control module including interface circuitry for enabling communication with an external device, a first communication means configured to communicate with the external device over the control network by the communication with the interface circuitry, a first coupling means configured to provide a data connection between the first communication means and the control network, and a first electrical isolation in the data connection between the first communication means and the control network,
    the second control module including a second communication means, a second coupling means configured to mechanically couple the first control module to the second control module, and a second electrical isolation, the second coupling means configured to provide a data connection between the first communication means of the first control module and the second communication means of the second control module, the second coupling means including a mechanism configured to cooperate with a corresponding mechanism of the first control module and one or more electrical contacts configured to directly connect to electrical contacts of the first control module when the first control module is mechanically coupled to the second control module,
    wherein the second electrical isolation is in the data connection between the first communication means and the second communication means,
    wherein the first control module does not provide electrical isolation in the data connection between the first communication means and the second communication means, and
    wherein the first electrical isolation and the second electrical isolation conform to a communication protocol which specifies one or more requirements for the electrical isolation.

2. The control assembly according to claim 1, wherein the first control module and the second control module of the control assembly are configured to form a node of the control network;
    and optionally the communication means of each control module is configured to communicate using a same communication protocol.

3. The control assembly according to claim 1, wherein the control assembly further comprises an interface unit configured to provide an electrical interface between the control assembly and the remainder of the control network; and optionally the interface unit comprises passive circuitry; and optionally the passive circuitry is configured to perform electrical signal conditioning;
    and optionally the interface unit does not comprise active circuitry.

4. The control assembly according to claim 3, wherein the interface unit comprises a first connector configured to connect to an external communication connection of the first control module or the second control module; and optionally the interface unit comprises a second connector configured to connect to the remainder of the control network; and optionally the second connector is configured to connect to a cabled plug.

5. The control assembly according to claim 3, comprising two or more interface units; and optionally the interface unit is integrated into the first control module or the second control module.

6. The control assembly according to claim 1, wherein the control network uses a single communication protocol.

7. A control network comprising:
    a first control module; and a second control module adjacent the first control module,
    the first control module including interface circuitry for enabling communication with an external device, a first communication means configured to communicate with the external device over the control network by the communication with the interface circuitry, a first coupling means configured to provide a data connection between the first communication means and the control network, and a first electrical isolation in the data connection between the first communication means and the control network,
    the second control module including a second communication means, a second coupling means configured to mechanically couple the first control module to the second control module, and a second electrical isolation, the second coupling means configured to provide a data connection between the first communication means of the first control module and the second communication means of the second control module, the second coupling means including a mechanism configured to cooperate with a corresponding mechanism of the first control module and one or more electrical contacts configured to directly connect to electrical contacts of the first control module when the first control module is mechanically coupled to the second control module,
    wherein the second electrical isolation is in the data connection between the first communication means and the second communication means,
    wherein the first control module does not provide electrical isolation in the data connection between the first communication means and the second communication means, and wherein the first electrical isolation and the second electrical isolation conform to a communication protocol which specifies one or more requirements for the electrical isolation.

* * * * *